United States Patent
Shepeck et al.

(10) Patent No.: US 6,563,287 B2
(45) Date of Patent: May 13, 2003

(54) METHOD OF CONTROLLING THREE PHASE MOTOR STARTING SEQUENCE

(75) Inventors: Matthew A. Shepeck, Holmen, WI (US); Michael W. Murry, Onalaska, WI (US)

(73) Assignee: American Standard International Inc., New York, NY (US)

( * ) Notice: Subject to any disclaimer, the term of this patent is extended or adjusted under 35 U.S.C. 154(b) by 35 days.

(21) Appl. No.: 09/747,643

(22) Filed: Dec. 22, 2000

(65) Prior Publication Data
US 2002/0079862 A1 Jun. 27, 2002

(51) Int. Cl.[7] .................................................. H02P 1/26
(52) U.S. Cl. ...................... 318/778; 318/767; 318/275; 318/276; 361/23; 361/28; 361/78; 361/87
(58) Field of Search .................................. 318/778, 771, 318/275, 276, 767; 361/23, 28, 78, 87

(56) References Cited
U.S. PATENT DOCUMENTS

| | | | | |
|---|---|---|---|---|
| 4,368,394 A | * | 1/1983 | Naimer | 307/115 |
| 4,446,415 A | * | 5/1984 | Taylor et al. | 318/771 |
| 4,689,546 A | * | 8/1987 | Stephens et al. | 310/176 |
| 5,051,639 A | * | 9/1991 | Satake et al. | 310/112 |
| 5,065,305 A | * | 11/1991 | Rich | 318/768 |
| 5,142,213 A | * | 8/1992 | Stelter | 318/771 |
| 5,363,489 A | * | 11/1994 | Snyder | 710/105 |
| 5,563,489 A | * | 10/1996 | Murry | 318/778 |
| 5,883,486 A | | 3/1999 | Earhart, Jr. et al. | 318/778 |

* cited by examiner

Primary Examiner—Rita Leykin
(74) Attorney, Agent, or Firm—William J. Beres; William O'Driscoll

(57) ABSTRACT

A motor starter. The motor starter comprises a motor; start, run, shorting and transition contactors operably associated with the motor; and run, start, shorting and transition auxiliary contactors. The transition auxiliary contactor operably controls the operation of a shorting contactor, and the shorting auxiliary operatively controls the operation of the run contactor.

21 Claims, 2 Drawing Sheets

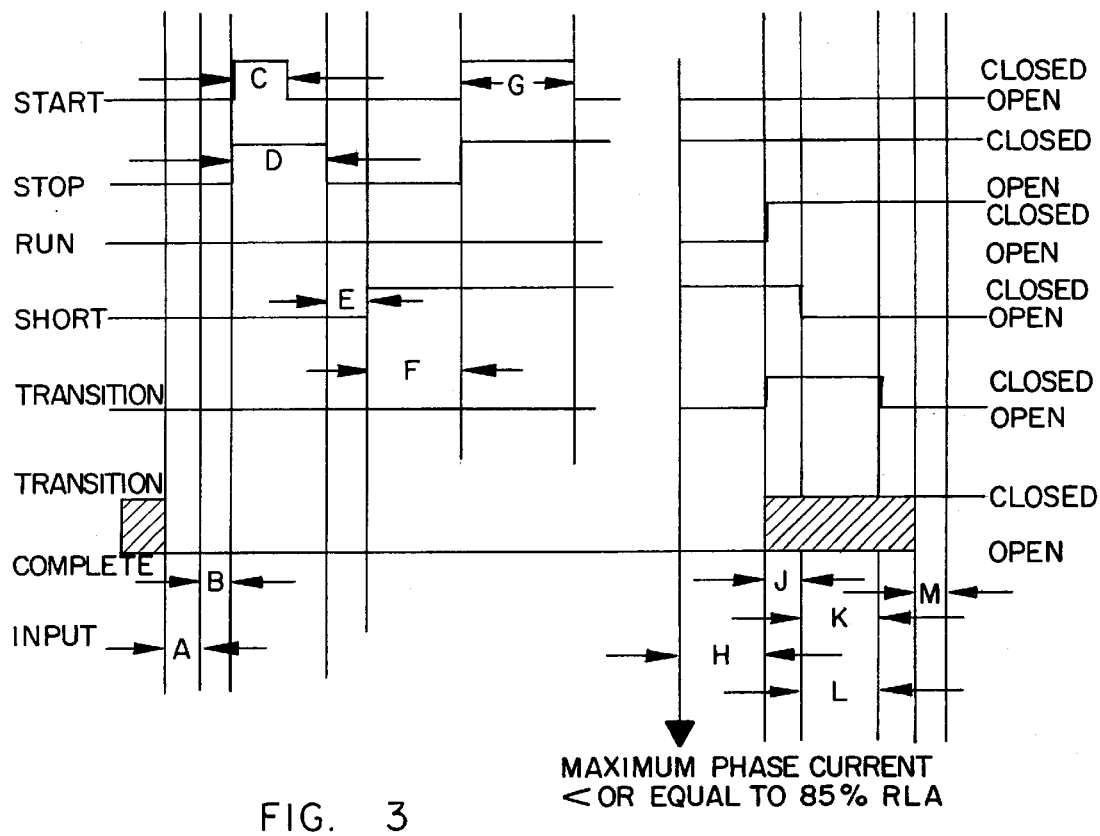

| INTERVAL | ACTUAL DESIGN |
|---|---|
| A = TEST FOR TRANSITION COMPLETE INPUT OPEN | 160 TO 240 MSEC |
| B = JUST DELAY TIME | 20 MSEC |
| C = CLOSE START CONTACTOR (32) AND TEST FOR NO CURRENT. STARTER INTEGRITY TEST | 500 MSEC |
| D = | 1 SEC |
| E = OPEN START CONTACTOR (32) | 200 MSEC |
| F = CLOSE SHORTING CONTACTOR (36) AND TEST FOR NO CURRENT, THEN WAIT FOR START COMMAND. STARTER INTEGRITY TEST | 1.0 SEC (MIN) |
| G = CLOSE | 2 SEC |
| H = WAIT 1.5 SEC AFTER PHASE CURRENTS DROP OF 85% | 1.5 SEC |
| J = BEGIN TRANSITION SEQUENCE | 100 MSEC |
| K = OPEN SHORTING CONTACTOR (36) | 400 MSEC |
| L = WAIT TO LOOK FOR TRANSITION COMPLETE | 2.26 – 2.34 SEC |
| M = FILTERING TIME ON TRANSITION COMPLETE INPUT | 160 – 240 MSEC |

METHOD OF CONTROLLING THREE PHASE MOTOR STARTING SEQUENCE

BACKGROUND OF THE INVENTION

The present invention is directed to an improved method and apparatus for controlling three-phase motor starting sequences. The invention includes direct control of starter contacts with adaptive timing using contactor auxiliaries. More specifically, transition and shorting auxiliaries are provided to respectively mechanically drop the shorting contactor out and to pull the run contactor in.

Today there are many types of electrical mechanical motor starters. Motor starters are used to accelerate a motor from its de-energized state to full speed. The type of starter that is used depends on the nature of the desired start and the desired characteristics and control wiring.

Wye delta starters include four contactors configured to accelerate the motor in steps. The first step configures the de-energized motor in a wye (star) configuration. In the wye configuration, a reduced voltage is applied across each phase of the motor. This allows for a gentler start than if the full voltage were applied across each motor phase. In the wye configuration, the voltage across each phase is the line-to-line voltage divided by the square root of three. Since a smaller voltage is applied across each phase, less torque is developed and less current is drawn. When the motor has accelerated to its maximum in the wye delta configuration, the wye delta starter reconfigures the motor phases so that the full line-to-line voltage is applied across each phase of the motor. In the configuration with full line-to-line voltage on each phase, the motor will finish its acceleration to full speed. During the transition from the wye configuration to the delta configuration, the starter switches in power resistors to ease the transition from wye to delta.

A second type of starter is the across the line starter. An across the line starter consists of a single contact that, when energized, applies full line-to-line voltage across each phase of the motor. With the full line-to-line voltage applied, the motor accelerates to its full speed.

A third type of starter is a primary reactor/resistor starter. A primary reactor/resistor starter consists of two contactors configured to accelerate the motor in two steps. The first step configures the de-energized motor with a series of reactors or resistors between the line voltage and the motor phases. In this configuration, the in-line reactor or resistor develops a voltage drop across it and therefore allows a reduced voltage to reach the motor. With this reduced voltage, the motor accelerates with a reduced torque and current. When the motor has fully accelerated in this configuration, the contactors are reconfigured so that the reactors or resistors are shorted out to allow the full line-to-line voltage to be applied to the motor phases. The motor will then accelerate to full speed.

A fourth type of starter is an auto transformer starter. An auto transformer starter consists of three contactors configured to accelerate the motor in two steps. The first step configures the de-energized motor in a reduced voltage mode by placing a transformer between the line voltage and the motor phases. In this configuration, the motor is accelerated by the reduced voltage created by the transformers so that the motor accelerates with a reduced torque and a reduced current. When the motor has reached its full acceleration in this configuration, the contactors are reconfigured so that the transformer is effectively removed from the circuit to allow full line-to-line voltage to be applied to the motor phases. With the full line-to-line voltage applied to the motor phases, the motor accelerates to full speed.

The goal of a starter, such as the starters previously described, is to accelerate a de-energized motor to full speed. The various types of starters are applied to specific applications depending upon the desired characteristics of the start itself. These characteristics include a low current draw or a high torque fast acceleration start. Most starters today use contactors and their auxiliaries to do much of the starting sequence. A control module may initiate the start sequence of a wye delta starter, for example, and after the motor is accelerated in the reduced voltage mode, the module will initiate the transition to a full voltage mode. The actual control of the sequencing of the motor from wye to delta in this example is controlled solely by the auxiliaries of the contactors. To accomplish this, there is a large amount of control wiring between the auxiliaries and the contactors. This large amount of wiring makes for a complicated control schematic for manufacturing and troubleshooting, and allows very little functional flexibility. Such an approach was used in a first generation motor starter sold by The Trane Company, a Division of American Standard Inc., as part of its UCP controller. Also, since the auxiliaries control the transition sequence, their timing and configuration is critical. Liability problems have been seen with these auxiliaries falling out of adjustment or failing altogether. Once failed, the problem is hard to trouble shoot since it requires the entire starting sequence to be emulated, and then monitored, to find the problem. Since some of the contactors are controlled by two or more auxiliaries, trouble shooting can sometimes only be done in multiple attempts to start the motor while monitoring various points with the starter fully powered. Trouble shooting of fully powered starter is very dangerous.

Previously, attempts to improve the control of contactors have included incorporating direct control of the contactors by the starter modules micro-controller. This resulted in simpler control wiring and benefits on the manufacturing and trouble shooting sides. However performance was compromised. The advantage of the original method of having the auxiliaries control the sequence is that the contactor timing reflects the size of the starter and allows for a most efficient sequence. Using the direct control method, the worse case timings such as for large slow contactors, had to be accommodated. This resulted in most starters having inappropriate timings and less than optimal starting characteristics. This approach was used in a second generation motor starter sold by The Trane Company, a Division of American Standard Inc., as a part of its UCP2 controller package.

SUMMARY OF THE INVENTION

It is an object, feature and advantage of the present invention to solve the problems with the previous starters.

It is an object, feature and advantage of the present invention to combine the advantage of the traditional auxiliary control starting sequence with the direct contactor controlled method to result in an improved method of starting and accelerating a motor.

It is an object, feature and advantage of the present invention to optimize the starting sequence. It is a further object, feature and advantage of the present invention to place a few key auxiliaries in the control circuit so that the contactor timing is adaptive to the size of the starter.

It is an object, feature and advantage of the present invention to simplify the control wiring of the starter for a motor. It is a further object, feature and advantage of the present invention to minimize wiring by allowing direct control of contactors and auxiliaries, and thereby simplify the manufacturing assembly of the starters.

It is an object, feature and advantage of the present invention to facilitate trouble shooting a motor starting sequence. It is a further object, feature and advantage of the present invention to provide simplified wiring so that control wiring schematics are easy to follow and trouble shoot.

It is an object, feature and advantage of the present invention to support trouble shooting modes in a motor starting sequence. It is a further object, feature and advantage of the present invention to ensure that a micro-controller has direct control of each contactor so that each contactor may be individually actuated to allow for fast identification of problem areas. It is a further object, feature and advantage of the present invention that this be accomplished without having to start the motor and without line voltage in the panel so as to make a safer trouble shooting environment.

It is an object, feature and advantage of the present invention to support manufacturing test modes. It is a further object, feature and advantage of the present invention to provide direct control of the contactors in a starting sequence so that the manufacturer can easily test the starter to verify correct wiring.

It is an object, feature and advantage of the present invention to minimize the dependency on auxiliaries in a motor starter. It is a further object, feature and advantage of the present invention that the micro-controller manage the starting sequence so that only those parts of the circuitry that need to be enabled are enabled. It is a still further object, feature and advantage of the present invention that specially sequenced auxiliaries are not needed and at most one auxiliary controls a contactor, so that auxiliary failures are easily found and identified. It is a yet further object, feature and advantage of the present invention to support contactor test modes in a motor starting sequence. It is another object, feature and advantage of the present invention to provide a micro-controller with direct control of the contactors so as to enable testing of their state thereby ensure that the contactors are functioning correctly prior to initiating a start, during the start sequence, and into the run mode.

It is an object, feature and advantage of the present invention to provide a programmable starter for a start motor sequence. It is a further object, feature and advantage of the present invention that the starter module may be programmed for the specific starter type so that micro-controller sequence timings may be adjusted for different starter types to optimize performance.

It is an object, feature and advantage of the present invention to provide smart starting of a motor starting sequence. It is a further object, feature and advantage of the present invention that a micro-controller directly control the contactor so as to be able to monitor how the start is proceeding as the start sequence progresses. It is a still further object, feature and advantage of the present invention to enhance detection of problems by allowing the start to be terminated if needed and a diagnostic called which can accurately pinpoint the problem by specifically identifying the problem area.

It is an object, feature and advantage of the present invention to minimize motor contact auxiliaries in a motor start sequence. It is a further object, feature and advantage of the present invention to reduce the seven auxiliaries traditionally required by a wye delta starter to a starter arrangement which uses only four auxiliaries.

It is an object, feature and advantage of the present invention to optimize the size of transition resistors in a motor start sequence. It is a further object, feature and advantage of the present invention to ensure that the transition sequence occurs as quickly as possible so as to allow the transition resistors to carry lower energy ratings than in previous designs.

It is an object, feature and advantage of the present invention to provide a motor starting sequence where the actual size of the contactors determines how fast the starting sequence energizes the motor to full speed.

The present invention provides a hybrid controller which combines aspects of a hard wired motor starting sequence with aspects of a primarily all electronically controlled motor starting sequence.

The present invention further provides a motor starter comprising: a motor; start, run, shorting and transition contactors operably associated with the motor; and run, start, shorting and transition auxiliary contactors. The transition auxiliary contactor operably controls the operation of a shorting contactor, and the shorting auxiliary operatively controls the operation of the run contactor.

The present invention also provides a method of starting a motor. The method includes opening a transition contactor; causing, responsive to the transition contactor, a transition auxiliary to drop a shorting contactor; and causing, responsive to the shorting contactor, a shorting auxiliary to pull in a run contactor.

The present invention additionally provides a method of starting a motor using a motor starting sequence. The method comprises closing a start contactor; opening the start contactor; closing a shorting contactor; closing a start contactor; monitoring current until it reaches a predetermined value; closing a transition contactor wherein the predetermine value is reached; closing a run relay; opening a transition auxiliary; dropping a shorting contactor; closing a shorting auxiliary; closing a run contactor; and opening a transition contactor.

The present invention further provides a motor starter for a three-phase motor. The motor starter comprises a controller; a three-phase motor; a run contactor operably connected to the motor and operatively capable of placing the motor in a run mode of operation; a start contactor operatively connected to the motor and operatively capable of placing the motor in a start mode of operation; a transition contactor operatively connected to the motor and operatively capable of transitioning the start mode of operation to the run mode of operation; a shorting contactor operatively connected to the motor and being operatively capable of shorting the blank contactor; and a transition auxiliary contact physically linked to the transition contactor and operatively associated with the shorting contactor to control the operable status of the shorting contactor.

BRIEF DESCRIPTION OF THE DRAWINGS

FIG. 3 is a graph of the sequence timing of a wye delta start in accordance with the present invention.

FIG. 4 is a table defining the actual timings of the graph of FIG. 3.

DETAILED DESCRIPTION OF THE DRAWINGS

U.S. Pat. No. 5,563,489 to Murry and U.S. Pat. No. 5,883,486 to Earhart Jr. et al. are examples of previous starters commonly assigned to the assignee of the present invention and incorporated herein by reference.

Figure 1:
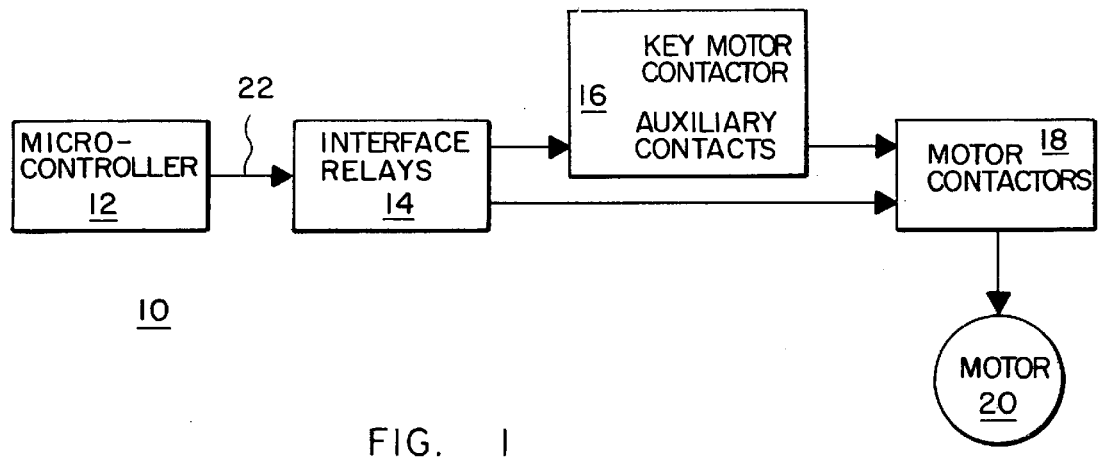
FIG. 1 is a block diagram of a motor starter in accordance with the present invention.

FIG. 1 shows an electro-mechanical starter arrangement 10 in accordance with the present invention. The electro-mechanical starter 10 includes a micro-controller 12, interface relays 14, key motor contactor auxiliary contacts 16, motor contactors 18, and a motor itself 20. The micro-controller 12 provides commands directly to the interface relays 14. The interface relays provide commands to the key motor contactor auxiliary contact 16 and both indirectly and directly to the motor contacts 18. The motor contactors 18 control the motor 20.

The present invention combines the advantages of direct control of starter contactors with the benefits of adaptive timing that come by using key contactor auxiliaries to proceed through certain parts of the starting sequence.

As shown in FIG. 1, the starter arrangement 10 includes four major components: the micro-controller 12, the interface relays 14, the motor contactor auxiliaries 16, and the motor contactors 18. Control lines 22 from the micro-controller 12 drive the interface relays 14. The interface relays 14, along with the key motor contactor auxiliaries 16, drive the motor contactors 18. The interface relays 14 provide a means for the micro-controller 12 outputs to drive the motor contactors 18.

Figure 2:
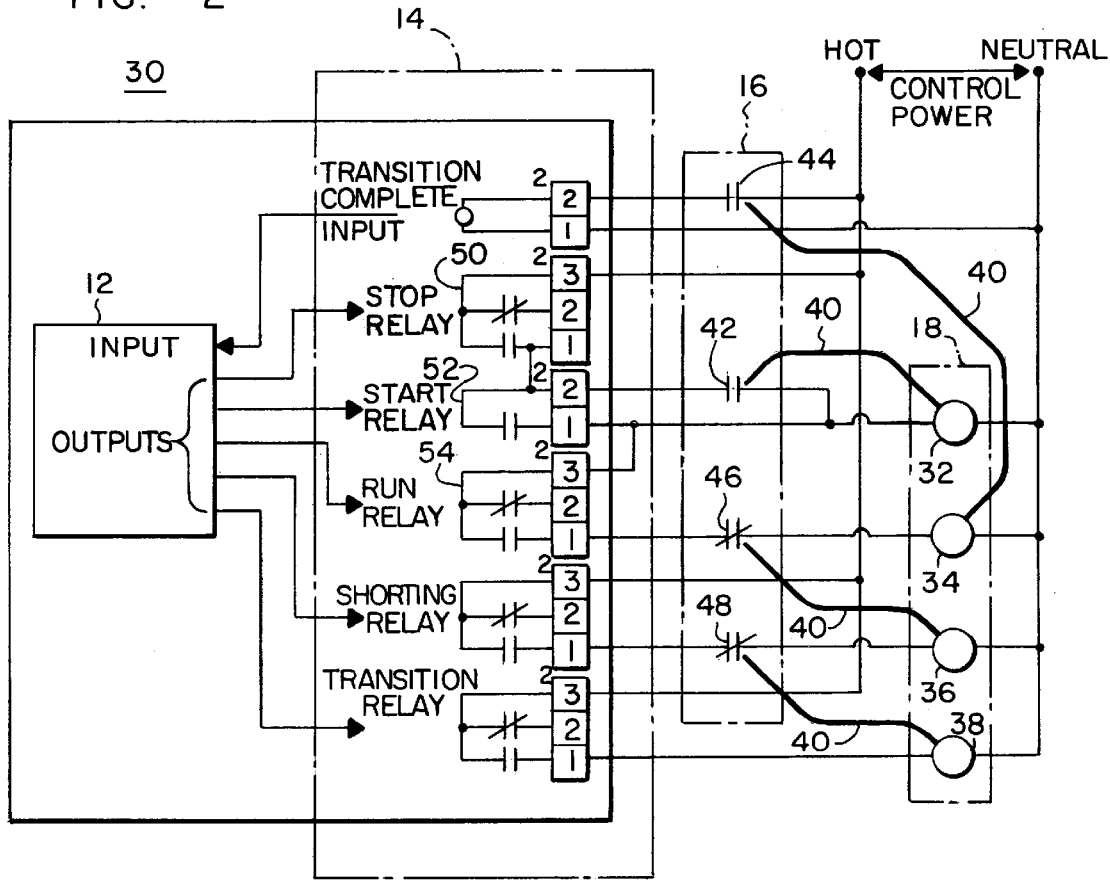
FIG. 2 is a generalized diagram of the starter and auxiliary connections of the motor starter of FIG. 1.

FIG. 2 is a preferred embodiment showing a wiring schematic 30 of the present invention in terms of a wye delta starter. A wye delta starter is depicted since a wye delta starter uses the most contactors. However, the present invention is considered applicable to all electrical mechanical starters. The schematic 30 illustrates that the motor contactors 18 include a start contactor 32, a run contactor 34, a shorting contactor 36 and a transition contactor 38. The schematic also illustrates that the key motor contactor auxiliary contact 16 include a start auxiliary contact 42, a run auxiliary contact 44, a shorting auxiliary contact 46 and a transition auxiliary contact 48. The transition contactor 38 is physically linked to the transition auxiliary contact 48 so that the transition auxiliary contact 48 is activated by the transition contactor 38. The shorting contactor 36 is physically linked to the shorting auxiliary contact 46 such that the shorting auxiliary contact 46 follows the operation of the shorting contactor 36. The run contactor 34 is linked to the run auxiliary contact 44 so that the run auxiliary contact 44 follows the operation of the run contactor 34. Finally, the start contactor 32 is physically linked to the start auxiliary contact 42 so that the start auxiliary contact 42 follows the operation of the start contactor 32. These links are illustrated by the lines 40. Although this application is in terms of a physical link between the auxiliary and main contactors, a person of ordinary skill in the art will recognize that mechanical, electrical, electro-mechanical, fiber optic, and other conventional links will all suffice. For purposes of this application, the term link encompasses all such variations.

The start and run auxiliary contacts 42, 44 have been used in previous starters, but the transition and shorting auxiliary contacts 46, 48 are new. The use of these key auxiliary contacts 46, 48 allows the transition from the wye to the delta, with the insertion of the transition power resistors, to go as fast as possible for this size starter.

This is accomplished by having the auxiliary contact of the previous stage contactor drive the next contactor in sequence. Specifically, the auxiliary transition contact 48 of the transition contactor 38 de-energizes the shorting contactor 36 and place the motor 20 in a delta mode. This in turn allows the auxiliary shorting contactor 46 of the shorting contactor 36 to energize the run contactor 34.

FIG. 3 shows the sequence timing of a wye delta starter in accordance with the present invention, while FIG. 4 includes a table defining the actual timings of such a start. That timing is based upon one set of components, and a person of ordinary skill in the art will recognize that varying the components will vary the timing.

The sequence of a wye delta start is as follows:

Before start, close the start contactor 32 by energizing stop and start interface relays 50, 52 to verify that there are no currents. This step is part of a pre-start test to verify that specific contactors are in their proper states. (C, D)

Next, open the start contactor 32 and close the shorting contactor 36 to verify that there are no currents. (E, F)

The start contactor 32 is again closed so that the motor phases are now configured in the wye mode and the motor 20 is accelerating. During this time, the run auxiliary contact 44 is monitored to ensure that it is in the proper state. If not, a diagnostic is called and the start is terminated. (G)

When the current magnitude falls below a predetermined value, preferably 85% of RLA, the motor 20 is determined to have completed acceleration in the wye mode. (H)

Consequently, the transition contactor 38 is closed to bring the transition resistors into the circuit. At the same time, the micro-controller 12 closes the run interface relay 54 to supply power to the run contactor circuit 34. However, the run contactor 34 does not pull in since the shorting auxiliary contact 46 is open. As the transition contactor 38 pulls in, the transition auxiliary contact 48 opens. Opening the transition auxiliary 48 causes the shorting contactor 36 to drop out. The transition resistors are now in series with the motor phases. As the shorting contactor 36 drops out, the shorting auxiliary contact 46 closes. Closing the shorting auxiliary contact 46 causes the run contactor 34 to pull in. The run contactor 34 shorts the transition resistor effectively removing them from the circuit in minimal time. With transition complete, the transition contactor 38 is de-energized. The micro-controller 12 then verifies that the run auxiliary contact 44 is in the proper closed state now and throughout the rest of the run. (J, K, L)

The present invention has been defined in terms of a unique starter sequence for a wye delta starter. But a person of ordinary skill in the art will recognize that the sequence, method and apparatus of the present invention are applicable to all electrical mechanical starters and will recognize that many modifications and alterations are readily apparent. The type of starter used can be varied, as can the component makeup and the resultant timing. All such modifications and alterations are contemplated to fall within the spirit and scope of the claimed invention.

What is claimed is:

1. A motor starter comprising:
   a motor;
   start, run, shorting and transition contactors operably associated with the motor; and
   run, start, shorting and transition auxiliary contacts;
   wherein the transition auxiliary contact operably controls the operation of a shorting contactor, and wherein the shorting auxiliary operatively controls the operation of the run contactor.

2. The motor starter of claim 1 wherein the run auxiliary is in operable communication with the run contactor, wherein the start auxiliary is in operable communication with the start contactor, wherein the shorting auxiliary is in operable communication with the shorting contactor, and wherein the transition auxiliary is in operable communication with the transition contactor.

3. The motor starter of claim 2 wherein the physical characteristics of the shorting auxiliary contact determines a timing of the motor starter.

4. The motor starter of claim 3 further including a controller operatively connected to and controlling the start, run, shorting and transition contactors.

5. The motor starter of claim 4 wherein the controller is programmable.

6. The motor starter of claim 5 wherein no more than four auxiliary contacts are used.

7. The motor starter of claim 6 including interface relays operably interconnected between the controller and the contactors and controlling the position of the contactors in response to the commands of the controller.

8. A method of starting a motor including:
   opening a transition contactor;
   causing, responsive to the transition contactor, a transition auxiliary to drop a shorting contactor; and
   causing, responsive to the shorting contactor, a shorting auxiliary to pull in a run contactor.

9. A method of claim 8 wherein the transition and shorting auxiliaries are sized to control the timing of the starting of the motor.

10. The method of claim 8 including the further steps of sizing the auxiliaries so that the contactor timing is adapted to the size of the motor starter.

11. The method of claim 10 further including a controller operably connected to the contactors and including the further steps of monitoring each step of the start as a start sequence progresses.

12. The method of claim 11 including the further step of terminating the start if a problem in the start is detected.

13. The method of claim 10 wherein the auxiliaries of a previous stage drive the contactors of the next stage in a starting sequence.

14. The method of claim 13 wherein the transition auxiliary of one stage de-energizes the shorting contactor of the next stage and wherein the shorting auxiliary of that next stage in turn energizes the run contactor of the following stage so as to place a motor in a run mode.

15. A method of starting a motor using a motor starting sequence, the method comprising:
   closing a start contactor;
   opening the start contactor;
   closing a shorting contactor;
   closing a start contactor;
   monitoring current until it reaches a predetermined value;
   closing a transition contactor wherein the predetermine value is reached;
   closing a run relay;
   opening a transition auxiliary;
   dropping a shorting contactor;
   closing a shorting auxiliary;
   closing a run contactor; and
   opening a transition contactor.

16. The method of claim 15 wherein the transition auxiliary controls the operability of the shorting contactor.

17. The method of claim 15 wherein the shorting auxiliary controls the operability of the run contactor.

18. The method of claim 15 wherein the method is followed in the order listed.

19. A motor starter for a three-phase motor, comprising:
   a controller;
   a three-phase motor;
   a run contactor operably connected to the motor and operatively capable of placing the motor in a run mode of operation;
   a start contactor operatively connected to the motor and operatively capable of placing the motor in a start mode of operation;
   a transition contactor operatively connected to the motor and operatively capable of transitioning the start mode of operation to the run mode of operation;
   a shorting contactor operatively connected to the motor and being operatively capable of shorting the run contactor; and
   a transition auxiliary contact physically linked to the transition contactor and operatively associated with the shorting contactor to control the operable status of the shorting contactor.

20. The motor starter of claim 19 further including a shorting auxiliary contact physically connected to the shorting contactor and operatively associated with the run contactor so as to control the operable status of the run contactor.

21. The motor starter of claim 20 further including a transition relay interconnecting the controller with the transition contactor so as to control the operable position of the transition contactor in response to commands from the controller, a shorting relay operatively associated with the controller and the shorting contactor and operatively capable of controlling the operable position of the shorting contactor in response to commands from the controller, a run relay operatively associated with the controller and the run contactor and operatively capable of controlling the position of the run contactor in response to commands from the controller, and a start relay operatively associated with the controller and the start contactor to control the operative position of the start contactor in response to commands from the controller.

* * * * *